United States Patent [19]

Connolly et al.

[11] Patent Number: 4,900,442

[45] Date of Patent: Feb. 13, 1990

[54] AIR SEAL CENTRIFUGE SCREEN BASKET

[75] Inventors: James D. Connolly; Richard L. McCormick, Jr., both of Hillcrest Subdivision

[73] Assignee: Conn-Weld Industries, Inc., Princeton, W. Va.

[21] Appl. No.: 147,939

[22] Filed: Jan. 25, 1988

[51] Int. Cl.⁴ ............................................. B01D 33/06
[52] U.S. Cl. .................................. 210/380.3; 210/381
[58] Field of Search .................. 210/370, 380.1, 380.3, 210/380.2, 381, 382; 209/279; 34/58; 68/24

[56] References Cited

U.S. PATENT DOCUMENTS

| 938,358 | 10/1909 | Walther et al. | 210/380.2 |
| 949,930 | 2/1910 | Hutchins | 34/58 |
| 1,075,476 | 10/1913 | Hutchins | 34/58 |
| 2,295,937 | 9/1942 | Crane et al. | 210/381 |
| 2,516,963 | 8/1950 | Derberwick et al. | 210/380.3 |
| 3,233,735 | 2/1966 | Hultsch et al. | 210/370 |
| 3,263,815 | 8/1966 | Golucke et al. | 210/380.3 |
| 3,993,564 | 11/1976 | Novak | 210/380.1 |

FOREIGN PATENT DOCUMENTS 292520  6/1930  United Kingdom ............. 210/380.1

Primary Examiner—Tom Wyse
Attorney, Agent, or Firm—Wilmer Mechlin

[57] ABSTRACT

A centrifuge screen basket mounting about an outer end portion a plurality of circumferentially spaced impeller blades in operation confronting and radially spaced inwardly of a seal ring of a centrifuge machine, the blades being uniformly tilted forwardly in the basket's direction of rotation for producing on such rotation a blast or force of air opposing and sealing against escape of fluid or other previously separated material past the basket's outer end.

5 Claims, 2 Drawing Sheets

4,900,442

AIR SEAL CENTRIFUGE SCREEN BASKET

BACKGROUND OF THE INVENTION

Centrifuge screen baskets ordinarily are frusto-conical with their larger their outer ends and, whether horizontally or vertically rotatable, have a seal ring around an outer end and depend on holding to a practical minimum clearance between that ring and a surrounding stationary ring on the centrifuge machine in which the basket is mounted for minimizing escape of fluid or other material past the basket's outer end.

The concern of the present invention is an improvement in centrifuge screen baskets for positively opposing leakage of material around an outer end of a basket.

SUMMARY OF THE INVENTION

The primary object of the present invention is to provide an improved centrifuge screen basket so constructed and arranged as in operation to oppose with positive force escape of material past an outer end of the basket.

Another object of the invention is to provide an improved centrifuge screen basket having about an outer end a cylindrical collar mounting a plurality of circumferentially spaced impeller blades so tilted in the direction of rotation of the basket as on rotation thereof to produce between the basket ring and a surrounding ring on the centrifuge machine mounting the basket an inward force or blast of air opposing and preventing escape of material past the basket's outer end.

An additional object of the invention is to provide a centrifuge screen basket of the character described in the immediately preceding object, wherein the impeller blades are uniformly spaced and tilted forwardly in the direction of rotation of the basket.

The foregoing and other objects and advantages of the invention will appear hereafter in the detailed description, be particularly pointed out in the appended claims, and be illustrated in the accompanying drawings, in which:

FIGURE DESCRIPTION

DETAILED DESCRIPTION

Figure 1:
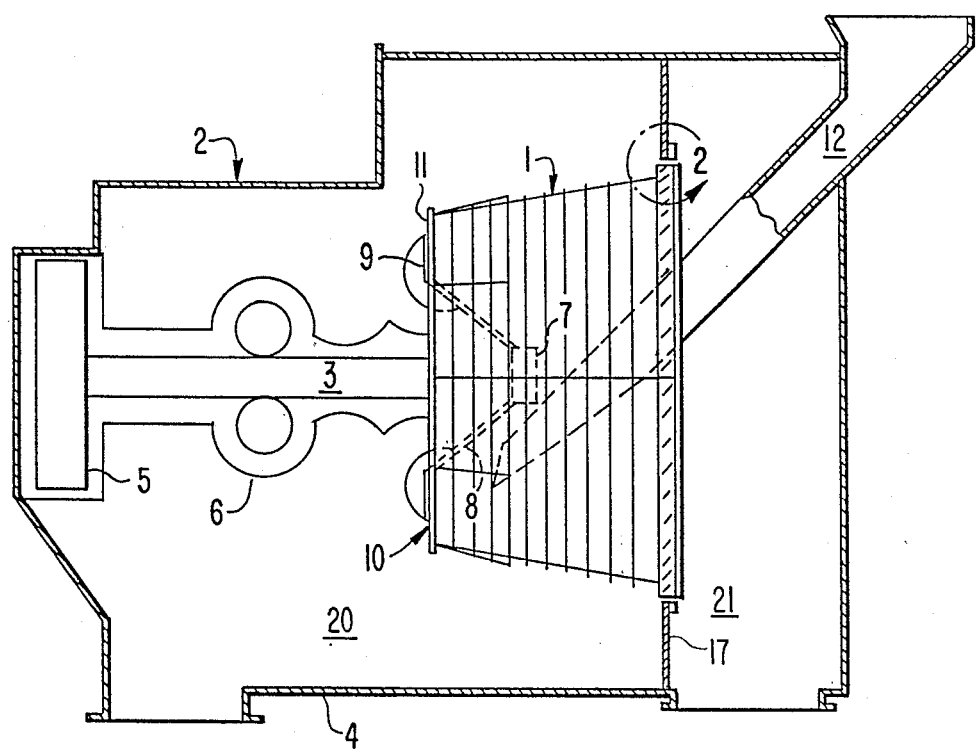
FIG. 1 is a schematic vertical sectional view of a centrifuge mounting for horizontal rotation and reciprocation a preferred embodiment of the centrifuge basket of the present invention.
Figure 2:
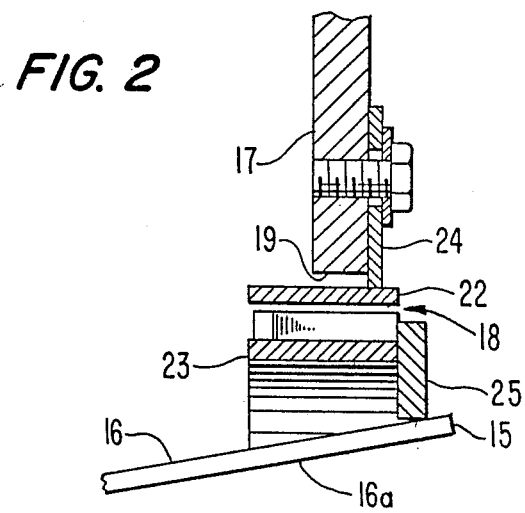
FIG. 2 is a fragmentary vertical sectional view on an enlarged scale of the so-numbered encircled portion of FIG. 1.
Figure 3:
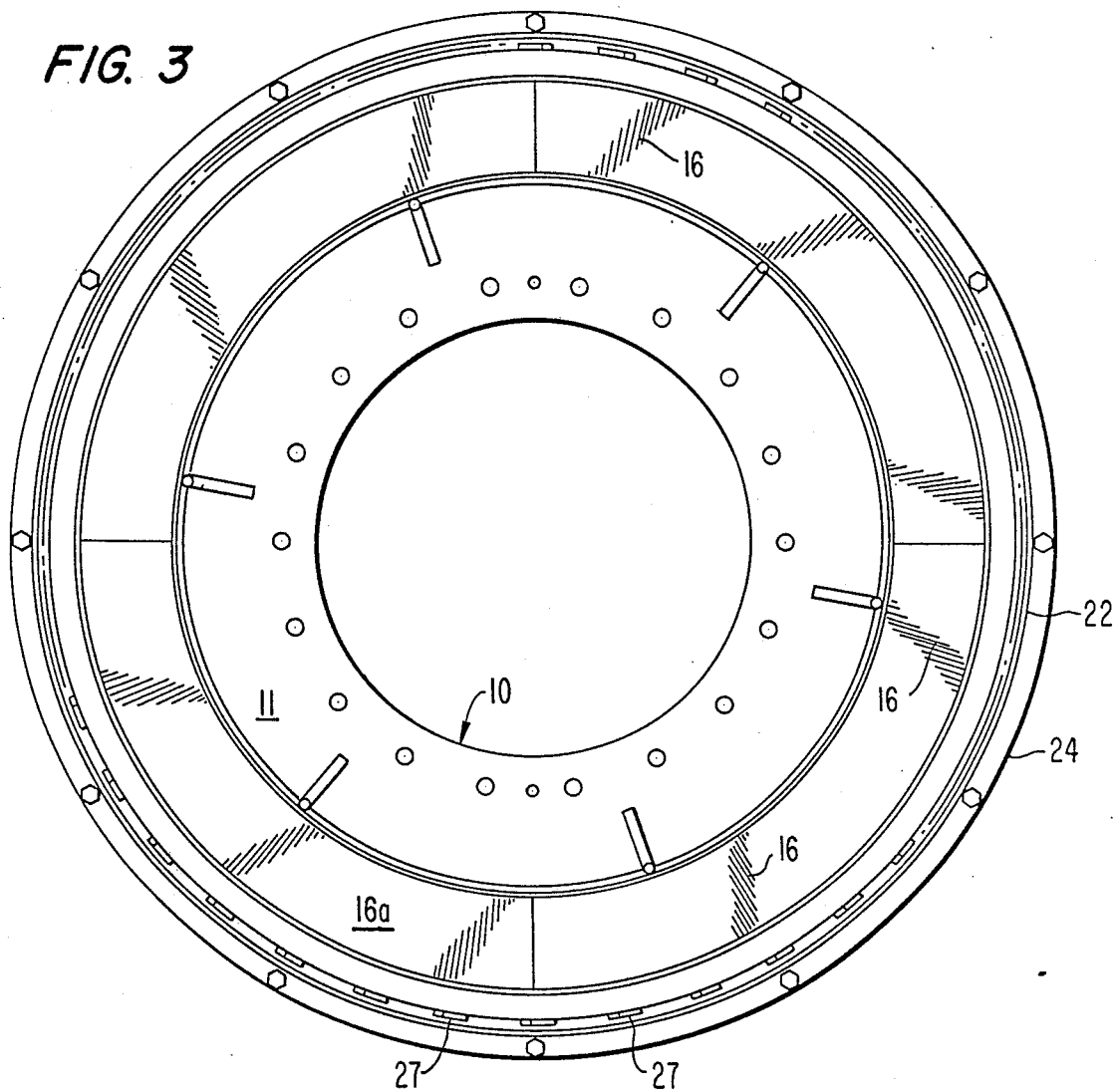
FIG. 3 is a bottom plan view on a scale intermediate FIGS. 1 and 2, showing the preferred embodiment of the basket and a surrounding stationary ring in the centrifuge machine.
Figure 4:
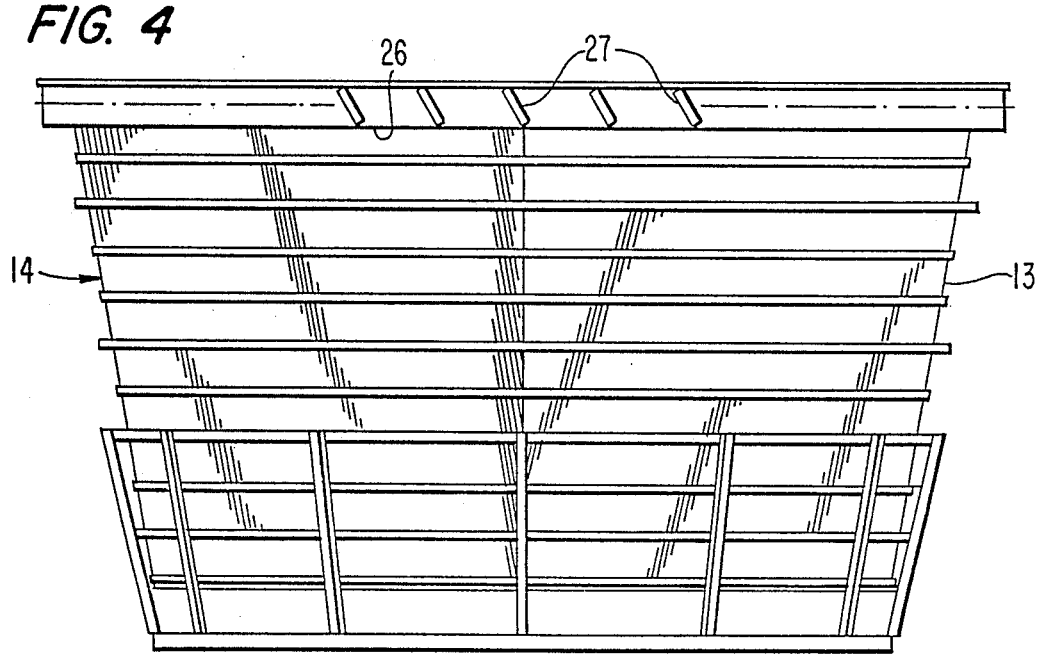
FIG. 4 is a side elevational view of the basket of FIG. 3 on the scale of that figure.

Referring now in detail to the drawings in which like reference characters designate like parts, the improved air sealed centrifuge screen basket of the present invention is designed for use in centrifuge machines in which it is impractical or impossible to prevent leakage or escape of previously separated material past and remixing there beyond an outer end of a basket in the machine. The improved basket is particularly designed for use in a centrifuge machine in which the basket is mounted for rotation about a horizontal axis and will be so described as exemplary of the invention.

As typical of its use in centrifuges, the improved air sealed centrifuge screen basket, designated as 1, has been illustrated installed or mounted in a WEDAG vibrating screen-type centrifuge or centrifuge machine 2. Suitably frusto-conical, the screen basket 1 is mounted in the centrifuge 2 for rotation about and oscillation or vibration on or along a horizontal axis. Both types of motion are applied or imparted to the basket 1 by a drive shaft 3 journaled in a housing 4 of the centrifuge 2, the shaft having on an inner or front end a conveniently belt-driven drive wheel or pulley 5 and being drivably engaged intermediate its ends by a vibration unit 6. A drive motor (not shown) in the housing 4, drivably connected to the drive wheel or pulley 5, drives the centrifuge 2.

The illustrated centrifuge 2, has on the rear or outer end of the shaft 3 a hub 7 concentrically mounting an imperforate, inwardly flaring conical supporting or connecting member 8 having as an integral or unitary inner end portion, a rib-reinforced peripheral mounting flange 9. In turn, the basket 1, for installing or mounting in the centrifuge 2, has on its smaller diameter front or inner end 10 an annular mounting disc or plate 11 fittable concentrically against and releasably attachable, as by bolting, to the mounting flange 9.

Adapted to separate into components by deliquifying or classifying solid-liquid, solid-solid and even liquid-liquid mixtures, the exemplary centrifuge 2 is a particularly designed for filtering or separating water from the particular solids of a coal or other slurry or solid-liquid mixture. Both mounted on and closed at its smaller inner end or bottom 10 by the conical support member 8 to which its mounting disc 11 is releasably attached and preferably bolted, the basket 1 conveniently has the slurry or other mixture fed to its inner end by a chute 12.

Under the impetus of the centrifugal and vibrational forces to which it is subjected in service, the slurry flows outwardly along the screen 13 at the side 14 of the basket toward the basket's larger outer end 15 and progressively has its liquid and solid components separated by passing liquids through and holding or retaining solids on tie rod-backed wedge or wedge-shaped wires 16 preferably forming the internal screening surface 16a of the screen. A dividing wall or partition 17, substantially coplanar with the basket's outer end 15, has a central opening or aperture 18 through which the basket is received or inserted for installing or mounting it in the centrifuge machine, the aperture having an inner edge 19 of larger diameter than and radially spaced outwardly of the basket's outer end. The wall 17 divides the centrifuge 2 internally into front and rear compartments 20 and 21 for receiving and temporarily storing respectively the liquid and solid or other components separated from the initial mixture.

The basket-receiving central opening 18 in the dividing wall 17 and the basket itself in operative position are substantially concentric or coaxial with each other and the drive shaft 3. However, because of manufacturing tolerances in the basket 1 or the centrifuge machine 2 or both, it is practically impossible, with the inner edge 91 of the opening 18 fixed, to center the basket on the opening. It therefore is the practice to provide especially horizontal or horizontal axis centrifuge machines with a cylindrical machine seal ring 22 mountable on the dividing wall 17 inside the opening 18. Horizontally directed or vertically disposed, the machine seal ring 22 is inserted in the opening 18 between or intermediate the opening's inner edge 91 and a confronting, horizontally disposed cylindrical seal collar or ring 23 on, about, surrounding or encircling the outer end portion of the basket. With an integral peripheral flange 24 overlapping and releasably attached, as by bolting, to the wall 17, the machine seal ring 22 is mounted for limited movement, adjustment or shifting in any direction on or parallel to the wall. The centrifuge machine 2 thus can compensate for manufacturing tolerances in itself or a basket by adjusting the machine seal ring 22 relative to the wall 17 to center the ring on a basket mounted in the machine.

While the lateral adjustability of the machine seal ring 22 relative to the wall 17 enables the ring to be centered on any basket installed in the centrifuge machine, the centering does not prevent leakage of water or other screened material between the machine ring 22 and the basket ring 23. Nor does the terming of the rings "seal rings" denote that they actually perform that function, since, to accommodate relative rotation of the basket, the fit between the rings must be fairly loose, with the radial spacing or clearance between the rings suitably on the order of at least about $\frac{1}{8}''$ (0.317 cm).

Conventionally, a horizontally rotatable screen basket has around its outer end an annular outer end plate 25, to the inside of which the outer ends of the wedge-shaped screen wires 15 are fixed. Again conventionally, the outer end plate 25 surmounts and has the same outside diameter as the basket seal ring 23 which it connects by welding to the rest of the basket. Unconventionally, in the improved basket of the present invention, the basket seal ring 23, although still surmounted by and welded to the outer end plate 25, is inset radially relative to or of less diameter than the end plate and mounts therebelow on its side 26 a plurality of radially outstanding, circumferentially spaced airfoil impeller blades 27, each tilted forwardly in the direction of rotation of the basket. Projecting radially beyond the end plate 25 and desirably extending the full width of both basket and machine rings 22 and 23, the blades 27 preferably are radially spaced from the machine ring by about $\frac{1}{8}''$ (0.317 cm) and are uniformly tilted and circumferentially spaced, suitably with a forward tilt of about 30 degrees and a spacing of about 10 degrees. The blades need not be of a particular airfoil shape and may simply be 2" (5.08 cm) lengths cut from $\frac{3}{8}''$ (0.951 cm) square stainless steel bar stock.

In any case, since a basket is always rotating when it is separating a mixture into components, whenever screened material might otherwise escape between the rings 22 and 23, the escape is always blocked or prevented by the opposing positive forward air blast or force generated by the rotating blades 27 and there is no remixing of previously separated components in the rear compartment 21 beyond the basket.

From the above detailed description it will be apparent that there has been provided an improved centrifuge screen basket mounting around an outer end airfoil blades tilted forwardly in the direction of rotation of the basket for generating on rotation a positive force of air opposing escape around and remixing beyond an end of a basket of a previously separated component. It should be understood that the described and disclosed embodiment is merely exemplary of the invention and that all modifications are intended to be included that do not depart from the spirit of the invention and the scope of the appended claims.

Having now described my invention, I claim:

1. In apparatus for centrifugally separating material, the combination with a centrifuge machine having a housing, a wall internally dividing said housing into front and rear compartments, and a machine seal ring inwardly bounding said opening in and mounted on said wall for limited relative movement in any direction parallel thereto for centering said ring on a basket in said opening, of a centrifuge screen basket removably inserted in said machine through said machine ring and mounted in said machine for rotation about a horizontal axis, a basket ring encircling an outer end portion of said basket and surrounded by and substantially coplanar with said machine seal ring, and a plurality of airfoil blades on and radially outstanding from said basket ring and interposed therebetween and said machine ring, said blades being uniformly tilted in the direction of rotation of said basket for generating a force of air opposing and sealing against leakage of material between said rings.

2. The combination according to claim 1, including an annular end plate on an outer end of said basket, screen wires forming an internal screening surface of said basket and having outer end portions extending through and fixed to said end plate, and wherein said basket ring is cylindrical and fixed to and capped by and inset radially relative to said end plate.

3. In apparatus for centrifugally separating material, the combination with a centrifuge machine having a partition dividing said machine internally into a plurality of compartments, and an opening in said partition, of a centrifuge screen basket rotatably mounted in said machine and removably inserted therein through said opening, a cylindrical basket ring encircling an outer end portion of said basket and surrounded by and substantially coplanar with an inner edge of said opening, and a plurality of circumferentially spaced airfoil blades on and radially outstanding from said basket ring, said blades being tilted forwardly in the direction of rotation of said basket and so spaced inwardly from said opening edge as on rotation to generate a force of air opposing escape of separated material between said basket ring and said partition.

4. The combination according to claim 3, wherein the airfoil blades are tilted forwardly at an angle of about 30 degrees and circumferentially spaced uniformly by about 10 degrees around said end portion.

5. The combination according to claim 3, wherein the basket is mounted for rotation about a horizontal axis, and including an annular end plate fixed to and surmounting the basket ring.

* * * * *